Jan. 9, 1940.   G. A. LYON   2,186,551
EXHAUST PIPE EXTENSION
Filed Oct. 25, 1937
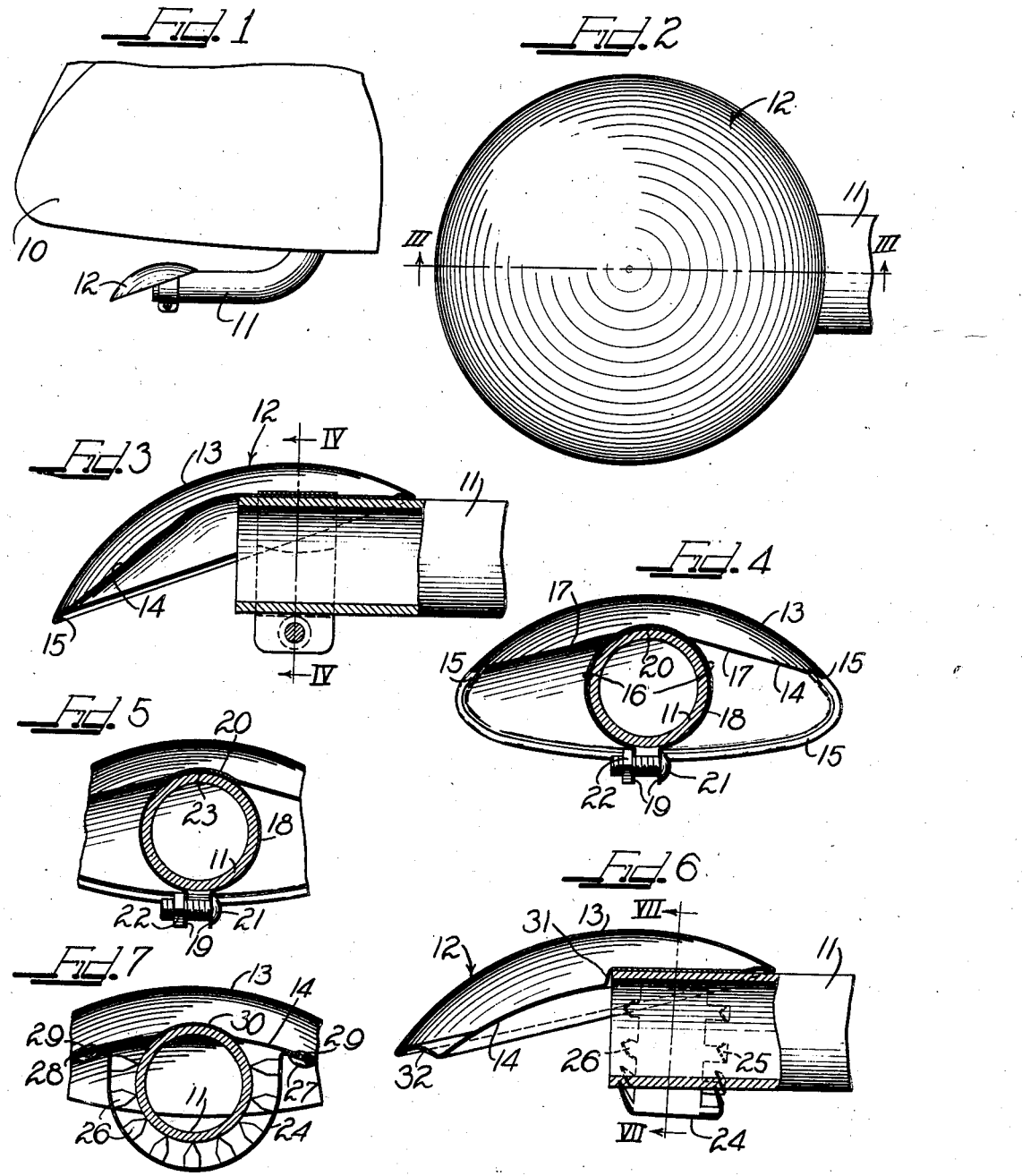
Inventor
GEORGE ALBERT LYON Patented Jan. 9, 1940

2,186,551

UNITED STATES PATENT OFFICE 2,186,551

EXHAUST PIPE EXTENSION

George Albert Lyon, Allenhurst, N. J.

Application October 25, 1937, Serial No. 170,785

2 Claims. (Cl. 138—25)

This invention relates to an exhaust pipe extension, and more particularly to an ornamental extension member which may readily and quickly be assembled on the exhaust pipe of an automotive vehicle.

Many arrangements have been provided in the past for enhancing the appearance of the end of the exhaust pipe of a motor vehicle. These arrangements, however, have not been entirely satisfactory. It is important, in constructing an exhaust pipe extension member, to provide a member which will be ornamental in appearance, which will be rugged and reliable in use, so that it will withstand the excessive vibrations of a vehicle while in motion, and which is equipped with means which will permit it to be readily and quickly mounted on the exhaust pipe. It is also important that some means be provided to protect the ornamental plate from the destructive action of the hot gases issuing from the exhaust pipe.

It is an object of this invention to provide a novel exhaust pipe extension member having the above highly desirable characteristics.

It is another object of this invention to provide a novel exhaust pipe extension member having novel means thereon for securing the member to the exhaust pipe.

It is a further object of this invention to provide a novel exhaust pipe extension member which is economical to manufacture, which is rugged and reliable in use, and which is equipped with novel means for quickly and firmly securing the member to an exhaust pipe.

Another and further object of this invention is to provide a novel exhaust pipe extension member having novel means thereon for protecting the ornamental surface thereof from the destructive action from the hot gases issuing from the exhaust pipe.

Another and still further object of this invention is to provide a novel segmental spherical exhaust pipe extension member which is arranged to extend obliquely rearwardly and downwardly from the rearward end of the exhaust pipe.

The novel features which I believe to be characteristic of my invention are set forth with particularity in the appended claims. My invention itself, however, both as to its organization and manner of construction, together with further objects and advantages thereof, may best be understood by reference to the following description, taken in connection with the accompanying drawing, in which:

Figure 1 is a side elevational view of the lower rear end of an automobile equipped with an exhaust pipe extension member on the rear edge of the exhaust pipe;

Figure 2 is a top view of the exhaust pipe extension member of Figure 1;

Figure 3 is a side elevational view in cross-section, taken along the line III-III of Figure 2;

Figure 4 is a rear elevational view in cross-section, taken along the line IV-IV of Figure 3;

Figure 5 is a rear elevational view of a modified form of clamping arrangement for securing the extension member to the exhaust pipe;

Figure 6 is a side elevational view in cross-section, showing a third embodiment of the present invention in which a clamping ring is provided which makes a biting engagement with the end of the exhaust pipe; and Figure 7 is a rear elevational view in cross-section, showing the exhaust pipe extension member of Figure 6.

Referring now to the embodiment of the invention illustrated in Figures 1 to 4, there is illustrated in Figure 1 the rear end of an automobile 10 which is equipped on its underside with a rearwardly extending exhaust pipe 11. Secured to the end of the exhaust pipe 11 is a segmental spherical exhaust pipe extension member 12 which is constructed and formed in accordance with the principles of the present invention.

In Figures 2, 3 and 4, the extension member 12 is illustrated in detail. As shown in these figures, the extension member 12 is formed from suitable sheet metal stock and includes a segmental spherical or dish-like outer member 13 which is preferably given a high polish finish, a chromium-plated finish or some other suitable ornamental finish over its outer surface. Secured over the underside of the member 13 is a sheet metal protective plate 14 which is preferably spaced from the under-surface of the member 13 in the manner indicated in Figure 3 of the drawing.

The protective plate 14 may be secured to the member 13 in any suitable manner, such, for example, as by crimping the outer marginal edge of the member 13 around the outer edge of the plate 14, as at 15. It has been found that when a protective plate such as 14 is provided on the underside of the ornamental exhaust pipe extension member 13 and placed in spaced relationship thereto, the destructive action caused by the hot gases issuing from the end of the exhaust pipe 11 is greatly reduced.

As may be seen best in Figure 3, the ornamental exhaust pipe extension member 12 is mounted in such a manner on the end of the exhaust pipe 11 that both the ornamental segmental spherical outer plate 13 and the protective inner plate 14 extend obliquely rearwardly and downwardly from the end of the exhaust pipe 11. The protective inner plate 14 thus causes the hot gases issuing from the exhaust pipe 11 to be deflected toward the ground, thereby reducing the extent of contamination of the atmosphere to the rear of the vehicle. The placing of the ornamental segmental spherical plate 13 at an angle permits the finished or high polished surface thereof to be seen more readily, and thus greatly enhances the appearance of the rear end of the exhaust pipe 11.

The manner in which the exhaust pipe extension member 12 is secured to the exhaust pipe 11 will now be described. Two tabs 16 are struck out of the protective plate 14 between the center of the plate 14 and the rear edge thereof. Two holes or apertures 17 are left in the protective plate 14 where the tabs 16 are struck therefrom. A split ring clamping member 18 having downwardly bent apertured ends 19 is passed through the apertures 17 over the top of the portion 20 of the protective plate 14 which intimately overlies the top of the exhaust pipe 11. Opposite ends of the clamping ring 18 extend around the exhaust pipe 11 to secure the exhaust pipe extension member 12 thereto. A clamping bolt 21 is passed through the apertured ends 19 of the clamping ring 18 and is secured in place by means of a clamping nut 22. By virtue of the fact that the clamping ring 18 hooks over a portion 20 of the protective plate 14 through the aperture 17, and by virtue of the fact that it extends substantially completely around the exhaust pipe 11 and is snugly secured thereto, the exhaust pipe extension member 12 is held securely and firmly in desired position on the end of the exhaust pipe 11.

In Figure 5 of the drawing, a modification of the invention is shown wherein the clamping ring 18 instead of passing through the aperture 17 over the central portion 20 of the protective plate 14, is spot welded or otherwise suitably secured as at 23 to the underside of the central portion 20 which intimately overlies the upper surface of the exhaust pipe 11. In this form of the invention, no apertures are necessary in the protective plate 14, and may therefore be eliminated. The lower ends 19 of the clamping ring 18 are secured together by means of a clamping bolt 21 and a clamping nut 22.

In Figures 6 and 7 of the drawing, a third embodiment of the present invention is illustrated. In this embodiment, the exhaust pipe extension member 12 is secured to the exhaust pipe 11 by means of a clamping member 24 which is provided with a double row of obliquely rearwardly extending teeth 25 and 26. The opposite ends 27 and 28 of the clamping member 24 are riveted or otherwise suitably secured, as at 29, to the protective plate 14 which is carried on the underside of the segmental spherical plate 13. As may be seen best in Figure 7 of the drawing, the portion of the clamping member 24 intermediate of its ends 27 and 28 lies in spaced relationship to the exhaust pipe 11. The double row of obliquely rearwardly extending teeth 25 and 26, however, are arranged in such a manner that the clamping member 24 may be passed over the rear end of the exhaust pipe 11, the teeth 25 and 26 being cammed outwardly a sufficient extent to permit them to ride over the exhaust pipe 11. Any attempt to force the clamping member 24 or the extension member 12 in the reverse direction, however, causes the teeth 25 and 26 to bite into the metal of the exhaust pipe 11. It will thus be understood that the exhaust pipe extension member 12 is quickly and firmly secured to the exhaust pipe 11 by virtue of the biting engagement which the teeth 25 and 26 make with the exhaust pipe 11.

A portion of the protective plate 14 is preferably shaped to intimately overlie the upper surface of the exhaust pipe 11, as at 30. In order to limit the forward movement of the extension member 12 as the teeth 25 and 26 are passed over the end of the exhaust pipe 11, the central portion of the protective plate 14 is bent downwardly, as at 31, at the rear end of the portion 30 which is shaped to intimately overlie the upper surface of the exhaust pipe 11. By shaping a portion of the protective plate 14 downwardly, as at 31, a convenient stop is provided which limits the extent to which the exhaust pipe extension member 12 may be shoved onto the end of the exhaust pipe 11.

Although the particular shape and configuration of the protective plate 14 may be varied through wide limits without departing from the spirit and scope of the present invention, it is preferable to form the protective plate 14 in such a manner as to maintain a substantial portion of the plate in spaced relationship to the undersurface of the ornamental plate 13. A slight variation of the cross-sectional configuration of the protective plate 14 near its outer marginal edge is shown in Figure 6 of the drawing at 32. It should be understood, however, that a protective plate 14 having a marginal edge portion similar to that shown in Figure 3 may be employed with the clamping member of the embodiment of the invention shown in Figures 6 and 7 without departing from the spirit and scope of the present invention.

From the above description, it will be apparent that I have provided an extraordinarily simple exhaust pipe extension member which is economical to manufacture, which is reliable in use, and which may be readily assembled on the end of an exhaust pipe by an unskilled person. It will furthermore be understood from a cursory inspection of the various figures of the drawing that I have provided an exhaust pipe extension which greatly enhances the general appearance of the rear part of an automobile and whose ornamental face is not subjected to the destructive influence of the hot gases issuing from the end of the exhaust pipe.

While I have shown particular embodiments of my invention, it will, of course, be understood that I do not wish to be limited thereto, since many modifications may be made, and I therefore contemplate by the appended claims to cover all such modifications as fall within the true spirit and scope of my invention.

I claim as my invention:

1. In combination with an exhaust pipe, an exhaust deflector including a segmental spherical upper member, a hot gas protective plate secured to the underside of said member and having a portion thereof shaped to intimately overlie an upper portion of said exhaust pipe, said protective plate having a shoulder formed opposite the end of said portion which intimately overlies a portion of said exhaust pipe, and a clamping band having a plurality of obliquely rearwardly extending teeth which extend into biting engagement with said exhaust pipe, said teeth preventing rearward movement of said deflector and said shoulder preventing forward movement of said deflector after said deflector has once been mounted on said exhaust pipe.

2. As an article of manufacture, an exhaust pipe accessory comprising a plate adapted to fit against one side of an exhaust pipe, and a band secured at both ends to said plate so as to extend around on the other side of said exhaust pipe, said band being formed of sheet metal and having teeth extending obliquely inward from at least one of its edges to make a biting engagement with said exhaust pipe.

GEORGE ALBERT LYON.